United States Patent
Harpur et al.

(10) Patent No.: US 10,043,327 B2
(45) Date of Patent: Aug. 7, 2018

(54) USING EMBEDDED ELECTROMAGNETIC SIGNATURES TO MONITOR AND AUTHORIZE COLLECTION OF PRINTED MATERIAL

(71) Applicant: INTERNATIONAL BUSINESS MACHINES CORPORATION, Armonk, NY (US)

(72) Inventors: Liam Harpur, Skerries (IE); Erik Katzen, Argyle, TX (US); Sumit Patel, Irving, TX (US); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/181,945

(22) Filed: Jun. 14, 2016

(65) Prior Publication Data

US 2017/0358156 A1    Dec. 14, 2017

(51) Int. Cl.
*G06K 5/00*    (2006.01)
*G07C 9/00*    (2006.01)
(Continued)

(52) U.S. Cl.
CPC .......... *G07C 9/00111* (2013.01); *G06F 21/60* (2013.01); *G06K 7/10366* (2013.01); *G06K 19/07707* (2013.01)

(58) Field of Classification Search
CPC . G07C 9/00111; G06F 21/60; G06K 7/10366; G06K 7/07707
See application file for complete search history.

(56) References Cited

U.S. PATENT DOCUMENTS

| 5,602,973 A * | 2/1997 | Nishiwaki | B65H 31/24 271/298 |
| 2006/0132304 A1 * | 6/2006 | Cabell | G06F 21/88 340/539.23 |

(Continued)

FOREIGN PATENT DOCUMENTS

JP    2008171069 A  *  7/2008

OTHER PUBLICATIONS

Lee et al., "A Model for Embedding and Authorizing Digital Signatures in Printed Documents", Information Security and Cryptography—ICISC 2002, 5th International Conference Seoul, Korea, Nov. 28, 2002, Revised Papers (Lecture Notes in Computer Science vol. 2587), pp. 465-477, Copyright 2003.

(Continued)

*Primary Examiner* — Laura Gudorf
(74) *Attorney, Agent, or Firm* — Robert C. Bunker (57) ABSTRACT

Monitoring and authorizing collection of printed media. A print task is received. A unique electromagnetic (EM) signature is generated for the received print task. Files for the print task are printed including the EM signature. Communication information is received including information exchanged between a radio frequency identification (RFID) badge associated with a user requesting access to a common printing area and a RFID reader associated with the common printing area, and information by an electromagnetic detector of a computer from the EM signature. Based on the first and second set of received communication information, an attempted collection of the printed media by the print task owner is determined. If the attempted collection is not made by the print task owner, a notification is transmitted to a computer associated with the print task owner indicating an unauthorized attempted collection of the printed media.

18 Claims, 6 Drawing Sheets

(51) Int. Cl.
*G06F 21/60* (2013.01)
*G06K 7/10* (2006.01)
*G06K 19/077* (2006.01)

(56) References Cited

U.S. PATENT DOCUMENTS

| | | | |
|---|---|---|---|
| 2008/0037034 A1* | 2/2008 | Ishii | H04N 1/00005 358/1.1 |
| 2008/0062454 A1 | 3/2008 | Bostick et al. | |
| 2008/0115207 A1 | 5/2008 | Go | |
| 2008/0148054 A1 | 6/2008 | Cahill et al. | |
| 2008/0151313 A1* | 6/2008 | Ishimaru | H04N 1/00342 358/400 |
| 2011/0179289 A1 | 7/2011 | Guenther | |
| 2014/0019761 A1 | 1/2014 | Shapiro | |
| 2014/0091142 A1* | 4/2014 | Pacque | G07F 17/12 235/380 |
| 2015/0082044 A1 | 3/2015 | Lehwany | |
| 2016/0299728 A1* | 10/2016 | Li | G06F 3/1222 |

OTHER PUBLICATIONS

Thingmagic, "Lexmark Adds RFID to Laser Printers", Accessed on Apr. 4, 2016, pp. 1-2, Copyright 2000-2016 ThingMagic, A Division of Trimble, http://www.thingmagic.com/index.php/applications-overview/lexmark-printer.

Tuohey, "Government Uses Color Laser Printer Technology to Track Documents", PC World, Article 118664, Nov. 22, 2004, pp. 1-4, http://www.pcworld.com/article/118664/article.html.

Mell et al., "The NIST Definition of Cloud Computing", National Institute of Standards and Technology, Special Publication 800-145, Sep. 2011, pp. 1-7.

IBM, "List of IBM Patents or Patent Applications Treated as Related (Appendix P)," Dec. 12, 2017, p. 1-2.

Harpur et al., "Using Embedded Electromagnetic Signatures to Monitor and Authorize Collection of Printed Material," Application and Drawings, Filed on Jul. 31, 2017, 30 Pages, U.S. Appl. No. 15/665,003.

* cited by examiner

USING EMBEDDED ELECTROMAGNETIC SIGNATURES TO MONITOR AND AUTHORIZE COLLECTION OF PRINTED MATERIAL

BACKGROUND OF THE INVENTION

The present invention relates generally to the field of embedding electromagnetic signatures, and more particularly to embedding electromagnetic signatures on printed material, such as printed pages, to monitor and authorize collection of the printed material.

SUMMARY

Embodiments of the present invention provide systems, methods, and program products for using embedded electromagnetic signatures to monitor and track printed media. A print task is received including one or more files to print onto printable media, and print task data including unique identification information of a print task owner. A unique electromagnetic signature is generated for the received print task, based on the received print task data. The one or more files are printed onto the printable media including the generated electromagnetic signature embedded on at least a portion of the printed media. Responsive to printing the one or more files onto the printable media, a first set of communication information is received that was exchanged between a radio frequency identification (RFID) badge associated with a user requesting access to a common printing area and a RFID reader associated with the common printing area configured to authorize access into the common printing area. A second set of communication information is received that was transmitted from a first computer, wherein the second set communication information is read by an electromagnetic detector of the first computer from the embedded electromagnetic signature. Whether an attempted collection of the printed media is performed by the print task owner is determined, based on the first and second set of received communication information. Responsive to determining that the attempted collection of the printed media is not performed by the print task owner, a notification is transmitted to a second computer associated with the print task owner indicating an unauthorized attempted collection of the printed media.

DETAILED DESCRIPTION

An organization can include a number of departments, such as finance, research and development, and human resource departments. An individual in a department may use printers in a printing area to print and collect printed materials or printed media, such as confidential information intended to be handled by only one or more specified individuals. For example, a member of the human resource department may print confidential employee information, such as social security and salary information, in a common printing area shared by multiple departments. In this example, if the printed material is accessed by a non-authorized individual, such as an individual that is not in the human resources department, then confidential nature of the information is breached.

Typically, a common printing area shared by departments within an organization can implement an automated badge reader authorizing individuals of the organization access to the common printing area. For example, an automated badge reader can be a radio frequency identification (RFID) reader or a near field communications (NFC) reader that reads identification information from a RFID tag or NFC tag associated with each individual of the organization. Based on the information read from the tag (RFID or NFC), the reader (RFID or NFC) can communicate with an automated security system to either permit or deny access to the common printing area. Typically, a common printing area shared by departments within an organization does not implement additional security measures beyond badge reader access to ensure authorized collection of printed confidential material. According to embodiments of the present invention, a monitoring environment can be deployed in a common printing area shared by departments within an organization to verify whether a member of the organization attempting to collect printed materials of a print task is authorized to do so, as described in greater detail below.

Embodiments of the present invention provide methods, systems, and computer program products for receiving a print task including print task data, such as unique identification information for a print task owner. Embodiments of the present invention can generate a unique electromagnetic (EM) signature based on the received print task data, for example, by encoding an RFID inlay, such that a microchip of the RFID inlay stores identification information for the print task. Embodiments of the present invention can attach, or embed, a unique EM signature generated for a print task onto a portion of printed material of the print task. Embodiments of the present invention can read an embedded EM signature to verify whether an individual attempting to collect printed materials of a print task is authorized to do so.

Generally, an individual within an organization that uses a computer system to initiate a print task to print requested material in a common printing area is a print task owner. A monitoring system of the common printing area can receive the initiated print task including print task data. A print task is completed after a unique EM signature is generated, based on the received print task data, and all of the requested material associated with the print task is printed, including the EM signature embedded onto a portion of the printed material of the print task. If the print task owner wishes to collect the printed materials from the common printing area after the print task is complete, then the print task owner may first be required to enter the common printing area via badge reader access. Upon authorized access into the common printing area, the print owner may then use another computer system, such as a mobile device, connected to the monitoring system to read the EM signature embedded on the portion of the printed material printed for the completed print task. The monitoring system can use information read by the mobile device and received by the badge reader to verify whether the individual attempting to collect printed materials of the completed print task is authorized to do so (i.e., the print task owner).

Figure 1:
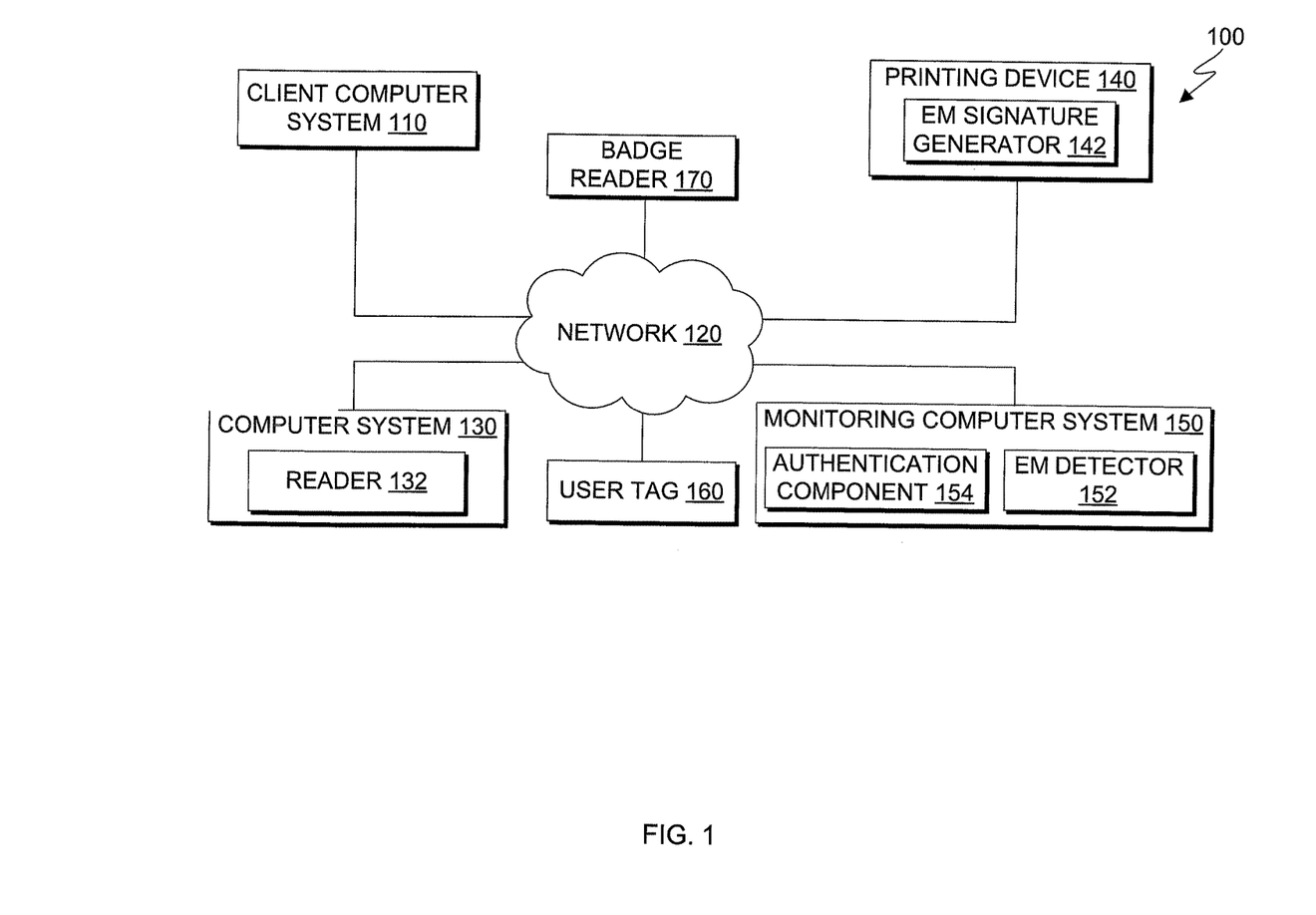
FIG. 1 is a block diagram of a monitoring environment, in accordance with an embodiment of the present invention.

FIG. 1 is a functional block diagram of monitoring environment 100 in accordance with an embodiment of the present invention. Monitoring environment 100 includes client computer system 110, computer system 130, printing device 140, monitoring computer system 150, user tag 160, and badge reader 170. Client computer system 110, computer system 130, and monitoring computer system 150 can be connected by network 120 and can be desktop computers, laptop computers, specialized computer servers, or other types of computer systems. In certain embodiments, client computer system 110, computer system 130, and monitoring computer system 150 represent computer systems utilizing clustered computers and components to act as a single pool of seamless resources when accessed through network 120. In general, client computer system 110, computer system 130, and monitoring computer system 150 are representative of an electronic devices, or combination of electronic devices, capable of executing machine-readable program instructions, as described in greater detail with regard to FIG. 4. In other embodiments, client computer system 110, computer system 130, and monitoring computer system 150 may be implemented in a cloud computing environment, as described in greater detail with regard to FIGS. 5 and 6.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between client computer system 110, computer system 130, printing device 140, monitoring computer system 150, and badge reader 170, in accordance with an embodiment of the invention.

Client computer system 110 represents a platform for initiating a print task. The phrase, "print task," as used herein, refers to a request transmitted to printing device 140 to print a file or a set of files, including documents, images, and other printable material. For example, a user of client computer system 110 may wish to print a document by interfacing with client computer system 110 to initiate a print task. The user initiating the print task may designate other individuals within a department and/or organization as authorized individuals for printed material collection. For ease of discussion, it should be understood that, a print task initiator, individuals designated by the print task initiator, and identifiers of the print task initiator and the designated individuals, are classified as print task owners.

In this embodiment, client computer system 110 transmits each initiated print task including print task data to printing device 140. In one embodiment, print task data can be a stored or user-provided image of a print task owner's face. In another embodiment, print task data can be identification information unique to a print task owner, such as an employee identification number. In general, print task data is data related to a print task, such as print task details (e.g., a media size, a number of copies, and a print priority), and/or data related to a print task owner, such as unique identification information, where the print task data is used by printing device 140 and components therein to generate a unique EM signature for a print task, as described in greater detail below.

Printing device 140 represents a device that receives print tasks initiated by client computer system 110, including print task data. Printing device 140 and components therein can generate a unique EM signature for a received print task, based received print task data. A print task is completed by printing device 140 after a unique EM signature is generated, and all of the requested material associated with the print task is printed, including the EM signature embedded onto a portion of the printed material of the print task.

In this embodiment, printing device 140 includes EM generator 142 configured to generate an EM signature for a print task received by printing device 140, based the received print task data. For example, EM generator 142 can generate a unique EM signature for a print task initiated at a first time by a print task owner, and generate another unique EM signature for another print task initiated at a later time by another print task owner. In one embodiment, EM generator 142 generates a unique EM signature for a print task by encoding a RFID inlay, such that a microchip of the RFID inlay stores identification information processed from received print task data. For example, a hash function may be performed on the received print task data, and the resulting hash code is embedded onto the RFID inlay, thus generating a unique EM signature for the received print task. A RFID inlay can be a passive RFID tag including an antenna configured to receive EM fields and a microchip configured to store data. In one embodiment, printing device 140 can utilize specialized ink exhibiting electrical-conductive properties, such as ink including aluminum or copper nanoparticles, to print onto an RFID inlay to modify an existing antenna or print a new antenna. For example, printing device 140 can print an antenna onto an RFID inlay, where the antenna can be configured to be optimized for a particular frequency band. After an EM signature is generated for a received print task, printing device 140 completes the print task by attaching, or embedding, the generated EM signature onto at least a portion of the requested materials as the requested materials are being printed.

In one embodiment, printing device 140 can include a secure enclosure configured to securely store printed materials for a completed print task. In this instance, the embedded EM signature can still be detected and read by reader 132 through the secure enclosure. Printing device 140 can be operated to temporarily disable the secure enclosure obstructing access to the securely stored printed materials upon receiving confirmation of an authorized collection attempt from monitoring computer system 150. Alternatively, if printing device 140 does not receive any such confirmation from monitoring computer system 150 indicating an authorized collection attempt, then printing device 150 will not disable the secure enclosure, thus preventing collection of the printed material for the completed print task.

User tag 160 represents a unique read-only passive data store assigned to each individual of a department and/or organization. In this embodiment, each print task owner has a unique user tag 160, such that an identity of each print task owner entering a common printing area is identified by monitoring computer system 150 and components therein. In this embodiment, user tag 160 is a passive NFC tag that can be read by badge reader 170, as described in greater detail below.

Badge reader 170 represents an NFC device that reads user tag 160. In this embodiment, badge reader 170 is implemented by monitoring environment 100 to ensure that only authorized individuals can access, or enter, a common printing area. Communication information generated by badge reader 170 after reading user tag 160 can be transmitted to monitoring computer system 150, such that monitoring computer system 150 and components therein can identify each print task owner entering a common printing area. In one embodiment, badge reader 170 can be part of a computer system configured to transmit communication information over network 120 to monitoring computer system 150.

Computer system 130 represents a platform for reading an EM signature from materials printed for a completed print task. As previously described, an embedded EM signature can act as a passive RFID tag, which can be read by reader 132 of computer system 130. In one embodiment, prior to initiating a print task, a print task owner can use computer system 130 to capture and transmit an image of the print task owner's face to monitoring computer system 150. In another embodiment, at a time of printed material collection, a user of computer system 130 may capture and transmit an image of the user's face to monitoring computer system 150 for print task owner identity verification, as described in greater detail below. In this embodiment, at a time a user of computer system 130 enters a common printing area to collect printed material, the user interfaces with computer system 130 to read an EM signature embedded on a portion of the printed material. For example, a user may hold computer system 130 within 10 cm of the embedded EM signature to establish communication between reader 132 and the embedded EM signature. Accordingly, this communication information can be transmitted by computer system 130 to monitoring computer system 150 for print task owner identity verification, as described in greater detail below.

Monitoring computer system 150 represents a platform for verifying print task owner identities and monitoring collection of printed material in a common printing area. In this embodiment, monitoring computer system 150 receives a plurality of information from components of monitoring environment 100 such as: an identity of a print task owner entering a common printing area from badge reader 170, information for an initiated print task (e.g., a name of print task owner, print destination, an image of a print task owner's face at the time of print task initiation and printed material collection, etc.) from client computer system 110 and computer system 130, and communication information between an embedded EM signature and reader 132 from computer system 130.

In this embodiment, monitoring computer system 150 includes EM detector 152 and authentication component 154. EM detector 152 represents a component configured to monitor, or track, location information for embedded EM signatures of each completed print task. For example, if printed materials including an embedded EM signature of a completed print task are removed from a common printing area, then EM detector 152 can detect the removal of the printed materials based on a relative signal strength indicator (RSSI) between the EM signature and EM detector 152.

Authentication component 154 represents a component configured to determine whether an attempted collection of printed material for a completed print task is authorized, based on a plurality of received information. An authorized collection of printed material for a completed print task is a collection made by a print task owner including individuals specified by the print task owner. In one embodiment, authentication component 154 can analyze a plurality of information and other data transmitted by client computer system 110, computer system 130, and badge reader 170. For example, authentication component 154 can analyze identification information exchanged between an embedded EM signature of a completed print task and reader 132, communication information that was exchanged between user tag 160 and badge reader 170, and compare an image of a print task owner's face received at the time of print task initiation with an image of a user's face interacting with computer system 130 received at the time of printed material collection, to determine whether an attempted collection of printed material is made by an authorized individual (i.e., a print task owner). In one embodiment, if authentication component 154 determines that an attempted collection of printed material for a completed print task is made by a respective print task owner, authentication component 154 can signal printing device 140 to release the printed material for the completed print task stored in the secure enclosure of printing device 140.

In another embodiment, authentication component 154 may represent a component configured to determine whether removal of printed material from a common printing area has been made by a print task owner. For example, authentication component 152 can determine whether an individual entering a common printing area is a print task owner of a recently completed print task, based on communication information transmitted by badge reader 170 and associated print task data transmitted by client computer system 110. Subsequently, if authentication component 152 determines that no print task owner of the recently completed print task entered the common printing area, and the printed materials for the completed print task were removed from the common printing area, based on an RSSI received by EM detector 152, then authentication component 154 can signal monitoring computer system 150 to notify a print task owner of the print task that the respective printed material have been removed by an individual that is not a print task owner.

Figure 2:
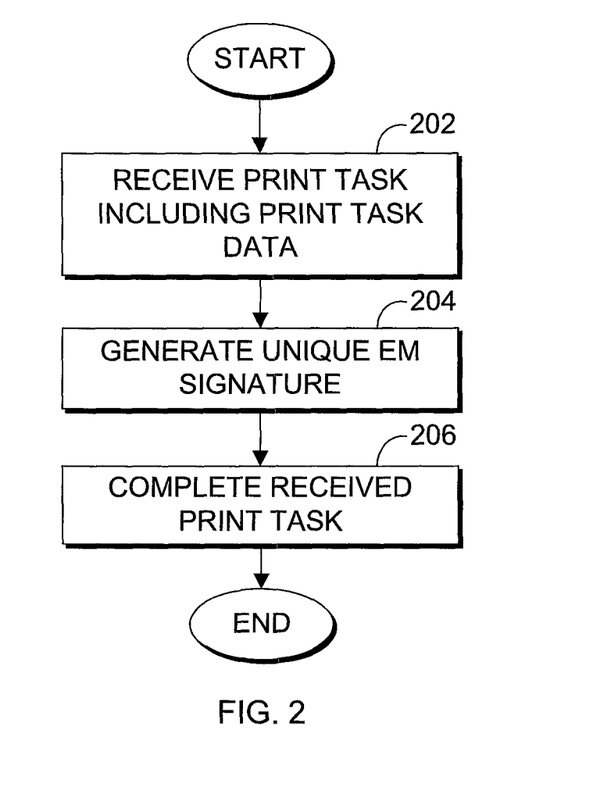
FIG. 2 is a flowchart illustrating operational steps for initiating a print task, in accordance with an embodiment of the present invention.

FIG. 2 is a flowchart illustrating operational steps for completing a print task, in accordance with an embodiment of the present invention. Printing device 140 receives a print task including print task data (step 202). EM generator 142 generates a unique EM signature for the received print task, based on the received print task data (step 204). Printing device 140 completes the received print task after a unique EM signature is generated, based on the received print task data, and all of the requested material associated with the print task is printed, including the EM signature embedded onto a portion of the printed material of the print task (step 206). In one embodiment, printing device 140 can indicate that the print task is complete by notifying computer systems of monitoring environment 100.

Figure 3:
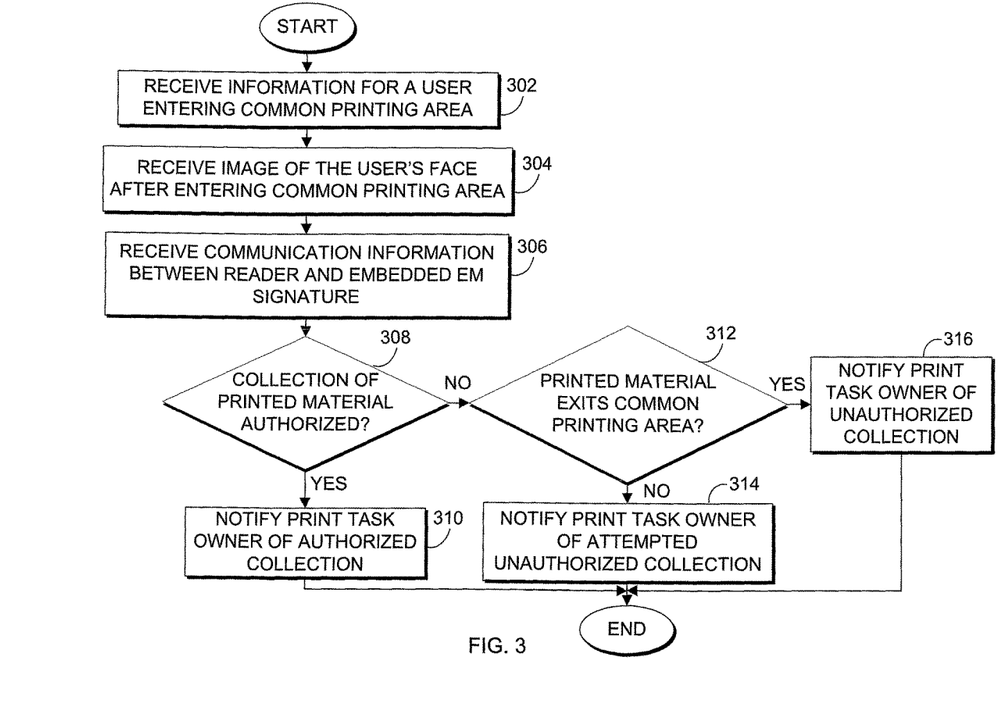
FIG. 3 is a flowchart illustrating operational steps for monitoring and authorizing collection of printed material, in accordance with an embodiment of the present invention.

FIG. 3 is a flowchart illustrating operational steps for verifying whether an individual attempting to collect printed materials of a print task is authorized for printed material collection, in accordance with an embodiment of the present invention. In this embodiment, a print task owner is authorized for printed material collection for a completed print task that was previously initiated by the print task owner. Monitoring computer system 150 receives information for a user associated with computer system 130 entering a common printing area from badge reader 170 (step 302). Monitoring computer system 150 receives an image of the user's face once the user is granted access (i.e., enters) to the common printing area (step 304). In another embodiment, monitoring computer system 150 receives other unique identification information for the user once the user is granted access to the common printing area. After the user interfaces with computer system 130 to read an embedded EM signature with reader 132, monitoring computer system 150 receives identification information between reader 132 and the embedded EM signature (step 306). Authorization component 154 determines, based on the received information and data, whether collection of the printed material for the completed print task is authorized (decision 308). If, authorization component 154 determines that that collection of the printed material is authorized ('yes' branch, decision 308), then monitoring computer system 150 notifies the print task owner of the authorized collection (step 310). In one embodiment, prior to transmitting a notification, authorization component 154 may signal printing device 140 to grant access to the printed material via a secure enclosure. If, authorization component 154 determines that collection of printed material is not authorized ('no' branch, decision 308), then EM detector 152 determines whether the printed material has been removed from the common printing area, based on an RSSI between the embedded EM signature and EM detector 152 (decision 312). In one embodiment, if authorization component 154 determines that the collection is not authorized, then authorization component 154 may signal printing device 140 to deny access to the printed material via a secure enclosure. If, EM detector 152 determines that the printed material has not been removed from the common printing area ('no' branch, decision 312), then monitoring computer system 150 notifies the print task owner of the attempted unauthorized collection (step 314). If, EM detector 152 determines that the printed material has been removed from the common printing area ('yes' branch, decision 314), then monitoring computer system 150 notifies the print task owner of the unauthorized collection.

Figure 4:
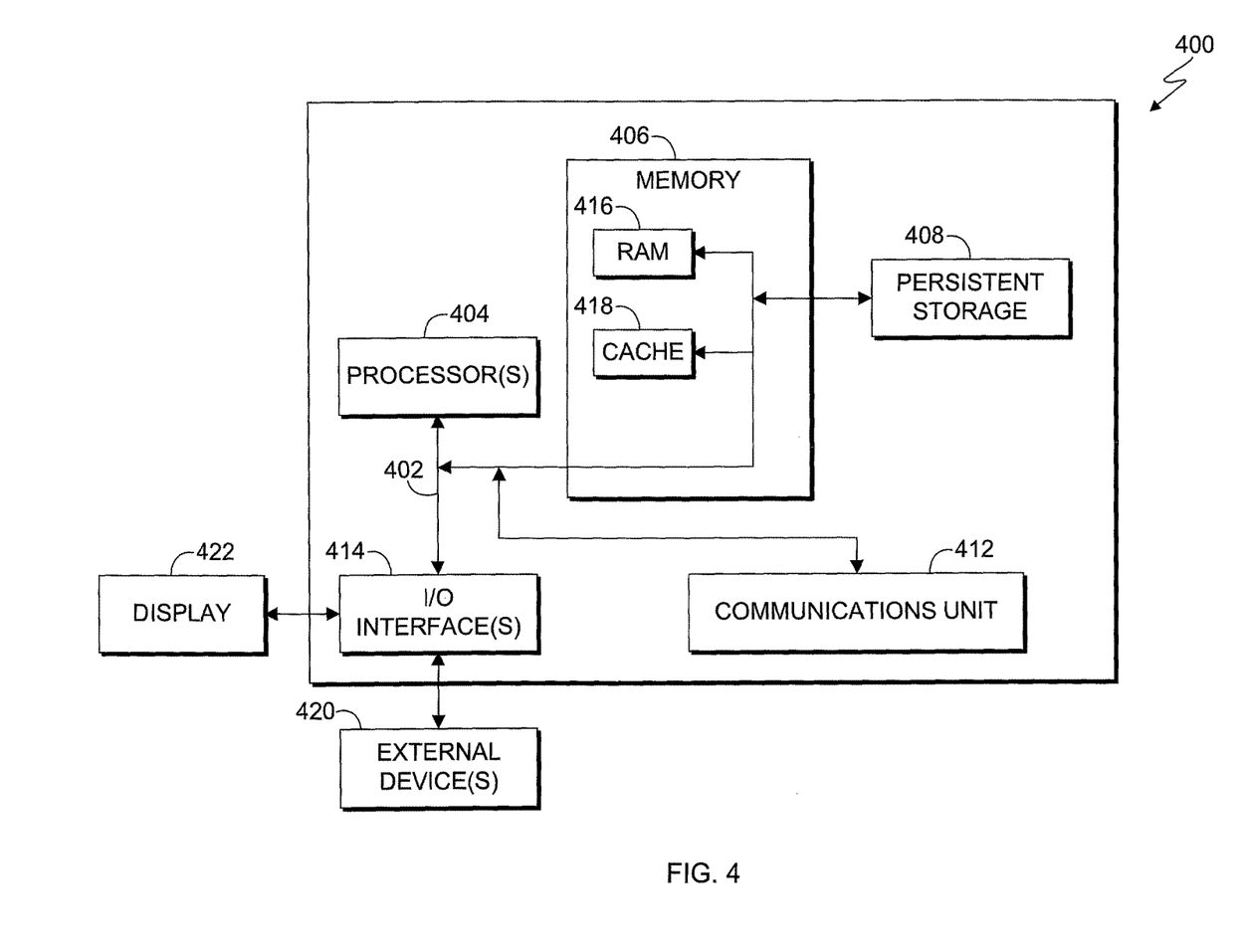
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420, such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
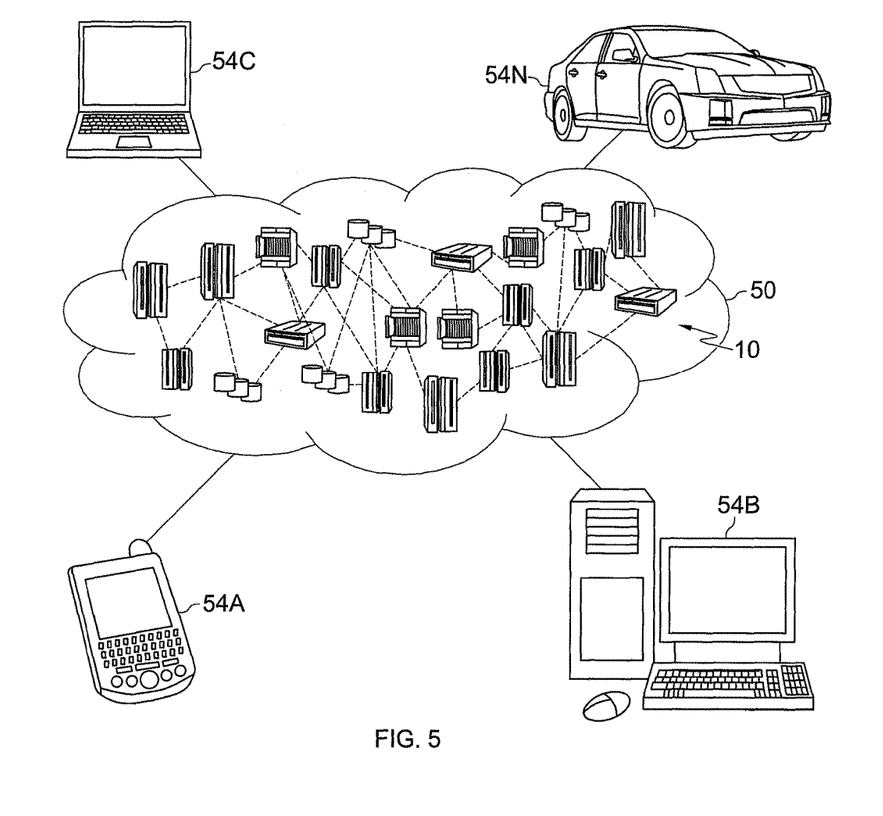
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
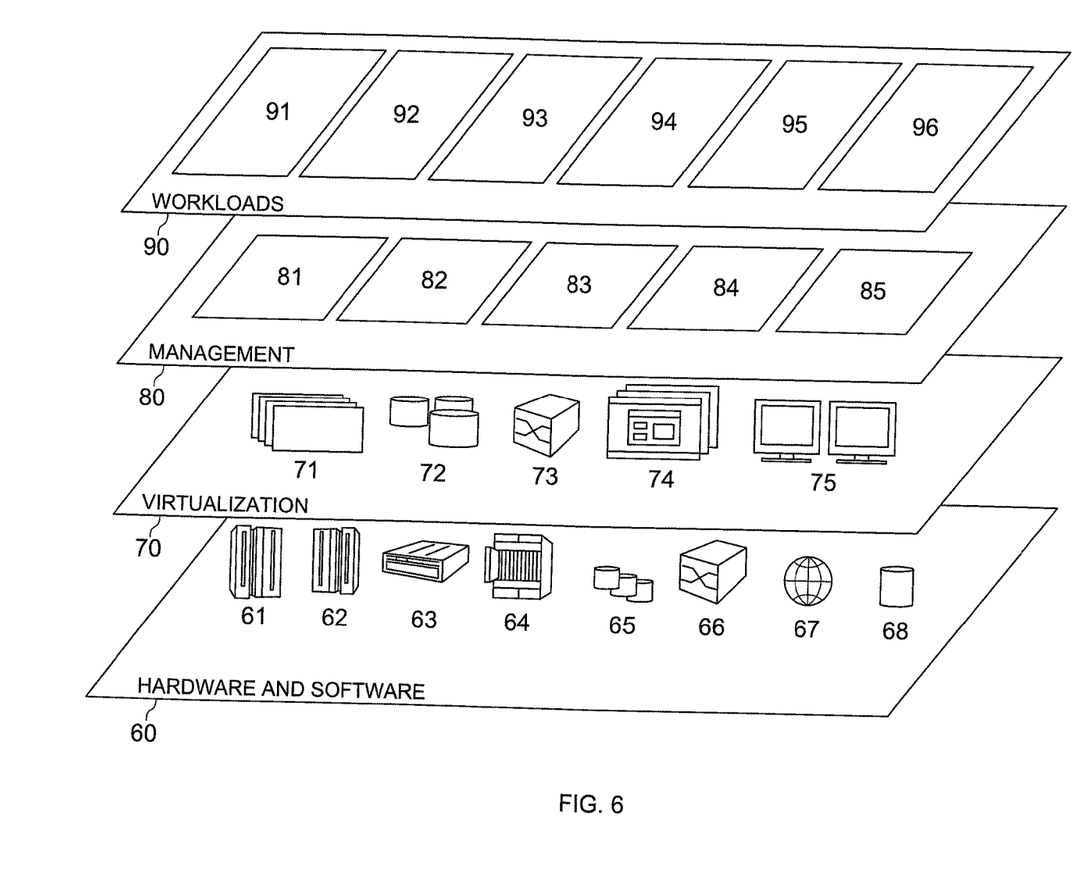
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring environment 96.

What is claimed is:

1. A method comprising:
receiving, by one or more processors, a print task including one or more files to print onto printable media, and print task data including unique identification information of a print task owner, wherein the print task owner identifies one or more authorized users to collect the printable media, and wherein the unique identification information includes an image of the print owner's face and the one or more authorized user's face at a time of print task initiation, and an image of the print owner's face and the one or more authorized user's face at a time of attempted collection of the printable media;
generating, by the one or more processors, a unique electromagnetic signature for the received print task, based on the received print task data, wherein the unique electromagnetic signature is associated with the print task owner and the one or more authorized users;
printing, by a printing device, the one or more files onto the printable media including the generated electromagnetic signature embedded on at least a portion of the printable media;
responsive to printing the one or more files onto the printable media, receiving, by the one or more processors, a first set of communication information exchanged between a radio frequency identification (RFID) badge associated with a user requesting access to a common printing area and a RFID reader associated with the common printing area configured to authorize access into the common printing area;
receiving, by the one or more processors, a second set of communication information transmitted from a first computer, wherein the second set of communication information is read by an electromagnetic detector of the first computer from the embedded electromagnetic signature;
determining, by the one or more processors, whether an attempted collection of the printable media is performed by the print task owner, based on the first and second set of received communication information;
determining, by the one or more computer processors, whether the attempted collection of the printable media is performed by one of the one or more authorized users, based on the first and second set of received communication information;
responsive to determining that the attempted collection of the printable media is not performed by the print task owner, transmitting, by the one or more processors, a notification to a second computer associated with the print task owner indicating an unauthorized attempted collection of the printable media; and
responsive to determining that the attempted collection of the printable media is not performed by one of the one or more authorized users, transmitting, by the one or more processors, the notification to a second computer associated with the print task owner indicating an unauthorized attempted collection of the printable media.

2. The method of claim 1, further comprising:
responsive to determining that the attempted collection of the printable media is not performed by the print task owner, operating, by the one or more processors, the printing device in the common printing area to deny access to the printable media for the completed print task; and
responsive to determining that the attempted collection of the printable media is performed by the print task owner, operating, by the one or more processors, the printing device to permit access to the printable media for the completed print task.

3. The method of claim 2, wherein operating the printing device to permit access to the printable media for the completed print task comprises:
transmitting, by the one or more processors, instructions to the printing device to temporarily disable a secure enclosure of the printing device, wherein the secure enclosure denies access to the printable media.

4. The method of claim 1, wherein the electromagnetic signature is a passive RFID tag configured to be read by the detector of the first computer that is a RFID reader.

5. The method of claim 4, wherein generating the unique electromagnetic signature for the received print task, based on the received print task data, comprises:
generating, by the one or more processors, a unique identifier for the print task and print task owner, using a hash function and the received print task data; and
encoding, by the one or more processors, the unique identifier onto a microchip of an RFID inlay including an RFID antenna to generate the unique electromagnetic signature for the received print task, whereby the microchip stores the unique identifier.

6. The method of claim 1, further comprising:
receiving, by the one or more processors, a relative signal strength indicator (RSSI) between the electromagnetic signature and another electromagnetic detector of the common printing area;
determining, by the one or more processors, whether the received RSSI is greater than a specified threshold; and
responsive to determining that the received RSSI is less than the specified threshold, transmitting, by the one or more processors, a notification to the second computer associated with the print task owner indicating that the printable media exited the common printing area.

7. A computer program product comprising:
one or more computer readable storage media and program instructions stored on the one or more computer readable storage media, the program instructions comprising:
program instructions to receive a print task including one or more files to print onto printable media, and print task data including unique identification information of a print task owner, wherein the print task owner identifies one or more authorized users to collect the printable media, and wherein the unique identification information includes an image of the print owner's face and the one or more authorized user's face at a time of print task initiation, and an image of the print owner's face and the one or more authorized user's face at a time of attempted collection of the printable media;
program instructions to generate a unique electromagnetic signature for the received print task, based on the received print task data, wherein the unique electromagnetic signature is associated with the print task owner and the one or more authorized users;

program instructions to print the one or more files onto the printable media including the generated electromagnetic signature embedded on at least a portion of the printable media;

program instructions to, responsive to printing the one or more files onto the printable media, receive a first set of communication information exchanged between a radio frequency identification (RFID) badge associated with a user requesting access to a common printing area and a RFID reader associated with the common printing area configured to authorize access into the common printing area;

program instructions to receive a second set of communication information transmitted from a first computer, wherein the second set of communication information is read by an electromagnetic detector of the first computer from the embedded electromagnetic signature;

program instructions to determine whether an attempted collection of the printable media is performed by the print task owner, based on the first and second set of received communication information;

program instructions to determine whether the attempted collection of the printable media is performed by one of the one or more authorized users, based on the first and second set of received communication information;

program instructions to, responsive to determining that the attempted collection of the printable media is not performed by the print task owner, transmit a notification to a second computer associated with the print task owner indicating an unauthorized attempted collection of the printable media; and program instructions to, responsive to determining that the attempted collection of the printable media is not performed by one of the one or more authorized users, transmit the notification to a second computer associated with the print task owner indicating an unauthorized attempted collection of the printable media.

8. The computer program product of claim 7, wherein the program instructions stored on the one or more computer readable storage media further comprise:

program instructions to, responsive to determining that the attempted collection of the printable media is not performed by the print task owner, operate the printing device in the common printing area to deny access to the printable media for the completed print task; and responsive to determining that the attempted collection of the printable media is performed by the print task owner, operating, by the one or more processors, the printing device to permit access to the printable media for the completed print task.

9. The computer program product of claim 8, wherein the program instructions to operate the printing device to permit access to the printable media for the completed print task, comprise:

program instructions to transmit instructions to the printing device to temporarily disable a secure enclosure of the printing device, wherein the secure enclosure denies access to the printable media.

10. The computer program product of claim 7, wherein the electromagnetic signature is a passive RFID tag configured to be read by the detector of the first computer that is a RFID reader.

11. The computer program product of claim 10, wherein the program instructions to generate the unique electromagnetic signature for the received print task, based on the received print task data, comprise:

program instructions to generate a unique identifier for the print task and print task owner, using a hash function and the received print task data; and program instructions to encode the unique identifier onto a microchip of an RFID inlay including an RFID antenna to generate the unique electromagnetic signature for the received print task, whereby the microchip stores the unique identifier.

12. The computer program product of claim 7, wherein the program instructions stored on the one or more computer readable storage media further comprise:

program instructions to receive a relative signal strength indicator (RSSI) between the electromagnetic signature and another electromagnetic detector of the common printing area;

program instructions to determine whether the received RSSI is greater than a specified threshold; and program instructions to, responsive to determining that the received RSSI is less than the specified threshold, transmit a notification to the second computer associated with the print task owner indicating that the printable media exited the common printing area.

13. A computer system comprising:

a printing device coupled to a second computer and a monitoring computer of a common printing area;

a radio frequency identification (RFID) reader associated with the common printing area configured to authorize access into the common printing area and configured to read a RFID badge associated with a user;

a first computer including an electromagnetic detector coupled to the monitoring computer;

the monitoring computer including one or more computer processors;

the monitoring computer including one or more computer readable storage media;

program instructions stored on the computer readable storage media for execution by at least one of the one or more processors, the program instructions comprising:

program instructions to receive a print task including one or more files to print onto printable media, and print task data including unique identification information of a print task owner, wherein the print task owner identifies one or more authorized users to collect the printable media, and wherein the unique identification information includes an image of the print owner's face and the one or more authorized user's face at a time of print task initiation, and an image of the print owner's face and the one or more authorized user's face at a time of attempted collection of the printable media;

program instructions to generate a unique electromagnetic signature for the received print task, based on the received print task data, wherein the unique electromagnetic signature is associated with the print task owner and the one or more authorized users;

program instructions to print the one or more files onto the printable media including the generated electromagnetic signature embedded on at least a portion of the printable media;

program instructions to, responsive to printing the one or more files onto the printable media, receive a first set of communication information exchanged between a radio frequency identification (RFID) badge associated with a user requesting access to a common printing area and a RFID reader associated with the common printing area configured to authorize access into the common printing area;

program instructions to receive a second set of communication information transmitted from a first computer, wherein the second set of communication information is read by an electromagnetic detector of the first computer from the embedded electromagnetic signature;

program instructions to determine whether an attempted collection of the printable media is performed by the print task owner, based on the first and second set of received communication information;

program instructions to determine whether the attempted collection of the printable media is performed by one of the one or more authorized users, based on the first and second set of received communication information;

program instructions to, responsive to determining that the attempted collection of the printable media is not performed by the print task owner, transmit a notification to a second computer associated with the print task owner indicating an unauthorized attempted collection of the printable media; and program instructions to, responsive to determining that the attempted collection of the printable media is not performed by one of the one or more authorized users, transmit the notification to a second computer associated with the print task owner indicating an unauthorized attempted collection of the printable media.

14. The computer system claim 13, wherein the program instructions stored on the one or more computer readable storage media further comprise:

program instructions to, responsive to determining that the attempted collection of the printable media is not performed by the print task owner, operate the printing device in the common printing area to deny access to the printable media for the completed print task; and responsive to determining that the attempted collection of the printable media is performed by the print task owner, operating, by the one or more processors, the printing device to permit access to the printable media for the completed print task.

15. The computer system of claim 14, wherein the program instructions to operate the printing device to permit access to the printable media for the completed print task, comprise:

program instructions to transmit instructions to the printing device to temporarily disable a secure enclosure of the printing device, wherein the secure enclosure denies access to the printable media.

16. The computer system of claim 13, wherein the electromagnetic signature is a passive RFID tag configured to be read by the detector of the first computer that is a RFID reader.

17. The computer system of claim 16, wherein the program instructions to generate the unique electromagnetic signature for the received print task, based on the received print task data, comprise:

program instructions to generate a unique identifier for the print task and print task owner, using a hash function and the received print task data; and program instructions to encode the unique identifier onto a microchip of an RFID inlay including an RFID antenna to generate the unique electromagnetic signature for the received print task, whereby the microchip stores the unique identifier.

18. The computer system of claim 13, wherein the program instructions stored on the one or more computer readable storage media further comprise:

program instructions to receive a relative signal strength indicator (RSSI) between the electromagnetic signature and another electromagnetic detector of the common printing area;

program instructions to determine whether the received RSSI is greater than a specified threshold; and program instructions to, responsive to determining that the received RSSI is less than the specified threshold, transmit a notification to the second computer associated with the print task owner indicating that the printable media exited the common printing area.

* * * * *